United States Patent
Leopold et al.

(10) Patent No.: US 6,267,580 B1
(45) Date of Patent: Jul. 31, 2001

(54) MICRO INJECTION MOLDING MACHINE

(75) Inventors: Phillip M. Leopold, North Barrington; Andrew R. Leopold, Hawthorn Woods, both of IL (US)

(73) Assignee: Murray Incorporated, Buffalo Grove, IL (US)

(*) Notice: Subject to any disclaimer, the term of this patent is extended or adjusted under 35 U.S.C. 154(b) by 0 days.

(21) Appl. No.: 09/184,797

(22) Filed: Nov. 2, 1998

(51) Int. Cl.$^7$ .................................................. B29C 45/02
(52) U.S. Cl. ........................... 425/557; 425/547; 425/559
(58) Field of Search ............................... 425/547, 557, 425/559

(56) References Cited

U.S. PATENT DOCUMENTS

| | | | |
|---|---|---|---|
| 2,881,477 | * 4/1959 | Truilzi | 425/451 |
| 3,117,348 | 1/1964 | Rees | 18/30 |
| 4,749,536 | * 6/1988 | Farrell | 264/219 |
| 4,775,308 | * 10/1988 | Schad et al. | 425/130 |
| 4,895,505 | * 1/1990 | Inaba et al. | 425/145 |
| 5,023,039 | * 6/1991 | Sorenson | 264/297.2 |
| 5,069,615 | * 12/1991 | Schad et al. | 425/556 |
| 5,499,915 | * 3/1996 | Fujita | 425/557 |
| 5,911,924 | * 6/1999 | Siegrist et al. | 264/40.1 |
| 5,945,045 | * 8/1999 | Parker | 264/40.1 |
| 5,955,120 | * 9/1999 | Deissler | 425/547 |

FOREIGN PATENT DOCUMENTS

| | | |
|---|---|---|
| 0672512 | 9/1995 | (EP) . |
| 04286617 | 10/1992 | (JP) . |
| 09085790 | 3/1997 | (JP) . |
| 9743106 | 11/1997 | (WO) . |
| 9941056 | 8/1999 | (WO) . |

* cited by examiner

*Primary Examiner*—Nam Nguyen
*Assistant Examiner*—Emmanuel S. Luk
(74) *Attorney, Agent, or Firm*—Emrich & Dithmar

(57) ABSTRACT

A molding machine for molding microparts containing between 0.001 to 3.5 cubic centimeters of plastic shot volume includes a plasticizing portion operatively connected to an injection portion and a mold portion. A valve member is provided to open and close the connection between the plasticizing portion and the injection portion. A linear motor member is associated with the injection portion to permit molding times of 0.01 seconds at pressures up to about 100,000 psi during injection of the molten plastic into the mold portion.

11 Claims, 6 Drawing Sheets

MICRO INJECTION MOLDING MACHINE

BACKGROUND OF THE INVENTION

The present invention relates to a novel injection molding machine for molding microparts containing a plastic shot volume of between about 0.001 to 3.5 cubic centimeters. Specifically, the micro injection molding machine utilizes pneumatic cylinder or cylinders for the plasticization and delivery of the resin material to the injection portion of the molding machine. A linear motor drives the injection portion to inject the resin material through the nozzle into the mold cavity to complete the injection molding of the micropart.

Injection molding processes are well known and have been developed for molding plastic parts. These processes generally involve melting plastic or resin pellets by feeding the pellets through a heated screw barrel utilizing a rotating screw. The heated barrel together with the heat supplied by the shear of the plastic pellets heats the resin pellets above their melting point. The screw is supported axially with a load and as the molten plastic moves to the front of the screw, the buildup in pressure forces the screw backwards until a desired volume of plastic has been developed in front of the screw. At this point, the rotating screw is stopped and the molten plastic is injected by moving the screw forward to force plastic through the nozzle into the cooled mold cavity to provide the desired molded part. The mold cavity is cooled and the injected plastic is fixed to the desired shape of the part. Such known technology and operations require that the forward motion of the screw must fill the mold cavity to obtain a good quality, dense molded part.

The prior art processes for injection molding are adequate for molding normal size parts utilizing shot sizes in excess of 3.5 to 5.0 cubic centimeters; however, when the microparts require very small shot volumes of less than 3.5 cubic centimeters there are significant problems with existing processes and technology. For example, the screw or auger means used to transport the plastic or resin pellets must be miniaturized in diameter to accept the resin pellets. If the screw is too large, it will contain many volumes of plastic relative to the part being molded. In such a situation, the plastic remaining heated in the barrel after each molding cycle degrades over time when held at this melting temperature. However, if the screw or auger is miniaturized and the screw flight depths are smaller than the pellet size, problems exist concerning accepting the pellets and feeding the resin plastic or pellets into the auger to allow compression and melting of the plastic. Although resin pellet diameter sizes are normally in the range of 2.5 mm or greater, miniature pellets of about 1.25 mm exist. However, the screw injection processes are limited to injection moldings of shot sizes larger than 3.5 cubic centimeters, even when the plastic pellet size is about 1.25 mm.

Furthermore, it should be pointed out that the smallest available screw or auger today is 14 mm in diameter and such auger devices are unable to precisely meter and maintain the accuracy of the molded plastic below the resolution limit of the screw stroke injection machine.

Additionally, existing injection molding processes for molding microparts are unsatisfactory because the microparts often require a thin wall thickness ranging from about 0.025 to 0.30 mm. To force and inject the plastic into these thin walled microparts without freezing, very high pressures and short injection times are required. Existing conventional molding machines generate approximately 25,000 psi pressure and require a 0.5 second injection time for molding shot sizes greater than 3.5 cubic centimeters.

However, if it is desired to injection mold shot sizes or volumes containing less than about 3.5 cubic centimeters, the necessary force required approaches 100,000 psi and a 0.01 second injection time when the wall thicknesses of the micropart is approximately 0.05 mm. Thus, existing prior art molding machines and processes are incapable of molding plastic shot sizes or volumes approaching 3.5 cubic centimeters or less to provide uniform molded microparts without large variations in part dimensions from shot to shot.

Accordingly, to injection mold microparts the injection molding machine must create a high injection pressure and possess controlled injection speed profiles substantially less than 0.5 seconds. Also, existing technology and processes utilize hydraulic pressures to create the injection pressures and injection speed profiles. However, hydraulic fluids are not readily compatible with clean room facilities. Thus, the injection molding of medical grade devices and related microparts is severally limited with existing technology.

One attempt to overcome the problems of these known injection molding machines and processes, has suggested that the injection machine include a system wherein the heated plastic is plasticized and then introduced into the front of an injection plunger. However, such machines have poor quality control over the filling of the plastic into the mold cavity because they utilize or require air cylinders to drive the injection plunger, a structure and mechanism which cannot accurately control the speed of injection. More importantly, such injection molding machines cannot stop the injection process as the mold cavity is filled except by the increase in pressure buildup during the molding process. The control of the molding process by measuring the increase in pressure yields a high variability in the molded parts, a result which is unsatisfactory for most molded operations. U.S. Pat. No. 5,380,187 describes a molding machine comprised of a combination of a screw or auger to mix, heat and plasticize the plastic or resin material for deposit before an injection plunger to accomplish the filling process. However, such devices are limited to molding shot volumes of substantially greater than 3.5 cubic centimeters and are unsatisfactory for molding thin-walled microparts.

SUMMARY OF THE INVENTION

It is one object of the present invention to provide a novel injection molding machine for molding microparts.

It is another object of the present invention to provide an injection molding machine for use in molding microparts which overcomes the deficiencies of prior art injection molding machines.

It is still another object of the present invention to provide a novel injection molding machine for molding microparts which utilize plastic shot volumes of between about 0.001 to 3.5 cubic centimeters.

It is yet another object of the present invention to provide a micropart injection molding machine which is capable of high pressure at a very high speed during the injection phase while preventing back flow into and past the injection cylinder portion of the micropart injection molding machine.

It is a further object of the present invention to provide a novel injection molding machine for microparts which is comprised of a plasticizing portion and an injection portion which permits the utilization of plastic shot volumes of between about 0.001 to 3.5 cubic centimeters.

Also, it is an object of the present invention to provide a novel micro injection molding machine which includes an injection portion driven by a linear motor for precise positioning and control of the flow of molten plastic into the mold cavity to mold the micropart.

Still, another object of the present invention is to provide a novel micro injection molding machine having precise centerline control of the injection plunger, nozzle and mold to maintain precise alignment of the resin flow channel resulting therefrom to the precise dimension of about less than 0.1 mm without complex realignment with each mold change.

Yet another object of the present invention is the design of a micro injection molding machine which utilizes a support ledge on the heated cylinder block that is on the centerline of the mold, injection nozzle, resin flow channel and injection cylinder which accommodates temperature changes of the heating block while maintaining the centerline of the molding machine constant.

Lastly, another object of the present invention is to provide an injection portion of a molding machine which is adapted to readily receive and accommodate various sized injection cylinders and injection pins to provide various plastic shot volumes of between about 0.001 to 3.5 cubic centimeters to mold the desired sized micropart.

The present invention is directed to an injection molding machine for molding microparts. The injection molding machine is comprised of a plasticizing portion, an injector plunger portion and a mold portion. The plasticizing portion softens and delivers the molten plastic or resin to the injection portion of the molding machine. The plasticizing portion includes a heated cylinder block surrounding or enclosing a plasticizing chamber and a screw member which meters the plastic or resin pellets into the plasticization chamber. A plasticizing plunger engages the molten plastic within the chamber. As the plastic melts, the plunger is sized to permit trapped air to exhaust between the plunger and the cylinder chamber wall. When the plastic or resin material is completely melted, the plastic is forced by the plasticizing air cylinder plunger past an opened valve member which separates the plasticizing portion from the injection portion into the resin flow channel of the injection portion.

The injection portion of the molding machine includes an injection cylinder which is positioned and secured within the cylinder block in axial alignment with the resin flow channel which cooperates with the nozzle to permit plastic to be injected into the mold. The injection portion is maintained on the centerline of the mold. A precision fitted injection pin member is fitted within the bore of the injection cylinder and is maintained in very close tolerance with respect to the bore, within the range of about 0.012 mm or less. This precision fitting of the injection pin within the bore of the injection cylinder as well as the utilization of a linear motor engaging the injection pin permits the application of high pressures at very high speeds during the injection phase of the molten resin through the resin flow channel and nozzle into the mold portion. Also, the precision fitting prevents back flow between the injection pin and the cylinder bore during the molding process. The valve member, positioned between the injection portion and the plasticizing portion is closed during the injection process to prevent back flow of the resin material into the lower pressure capacity plasticizing cylinder. The valve member is a tapered valve which is, preferably, powered by an air cylinder. The valve member is positioned inside the plasticizing cylinder block and is maintained at the proper uniform plastic melt temperature.

When the heated plastic or resin material is forced by the plasticizing cylinder into the resin flow channel and the injection cylinder, the valve member is closed and the injection pin is driven forwardly to pressure the flow of heated plastic through the nozzle and sprue into the closed mold cavity.

The injection pin is driven by an electric motor means. The term electric motor means may be used to describe a rotary motor coupled to a ball screw device which converts the rotary motion to a linear motion. However, it is a preferred embodiment of the present invention that the electric motor means is a linear motor which directly provides linear motion to the injection pin. The term "linear motor" is used to describe a motor that is electrically driven in a linear motion rather than in a rotary motion. One type of linear motor useful in the present invention is a linear servo or stepper motor manufactured and sold by Trilogy Linear Motor, Webster, Tex. The linear motor provides a linear motion which engages and controls the speed and pressure engaging the injection pin.

The electronic control of the linear motor provides for the very high speed movement of the injection pin while maintaining precision control and location of the injection pin. The position of the injection pin is continuously monitored and fed to the electronic control system by a linear measuring device, such as an LVDT. The injection pin is engaged and pushed by the linear motor, but is not necessarily directly coupled to the linear motor. If desired, the elimination of direct coupling between the injection pin and linear motor avoids the necessity of precise alignment with respect to the injection pin and the linear motor. The forward axial movement of the injection pin within the resin flow channel injects between about 0.001 to 3.5 cubic centimeters of plastic shot volume into the mold, as desired.

After completion of the mold cycle, the injection pin is axially moved rearwardly under load as the valve member is opened and molten plastic from the plasticizing cylinder enters the resin flow channel to force the injection pin rearwardly from the mold portion. The flow of plastic into the resin flow channel returns the injection pin during the reloading cycle of a predetermined shot volume of molten plastic from the plasticizing portion into the injection portion.

After the flow of molten resin into the resin channel, known as the preparation of a predetermined shot volume of molten plastic, the mold portion is moved axially away from the nozzle and the mold is opened to permit ejection of the molded micropart from the molding cavity. Thereafter, the valve member is closed and the mold portion is moved axially to engage the nozzle to repeat the molding cycle for the predetermined shot volume.

As set forth above, the injection nozzle cooperates with the injection pin to facilitate injection of the heated resin or plastic material through the sprue opening into the mold cavity. The mold cavity is designed such that the molded micropart may be readily removed from the mold cavity by ejection pins or suction after each cycle of operation. By utilizing plastic or resin flow channels of about 0.5 to 6.0 mm in diameter, plastic shot volumes of between about 0.001 to 3.5 cubic centimeters may readily be achieved. Moreover, because of the reduced size of the plastic flow channel, the number of parts that can be molded, utilizing the molten plastic or resin contained within the plasticizing chamber, is reduced thereby insuring maximum molding efficiency without degradation of the plastic or resin material between loadings of the pellets.

Other and additional objects of the present invention will be apparent from the following description and claims that are illustrated in the accompanying drawings which, by way of their illustration, show a preferred embodiment of the present invention and the principles thereof and what is now considered to be the best mode contemplating in applying those principles. Other embodiments of the present invention employing the same or equivalent principles may be used and structural changes may be made as desired by those skilled in the art without departing from the present invention and the scope of the appended claims.

DESCRIPTION OF THE DRAWINGS

The foregoing description or other characteristics, objects, features and advantages of the present invention will become more apparent upon consideration of the following detailed description, having reference to the accompanying drawings wherein.

DETAILED DESCRIPTION

Figure 1:
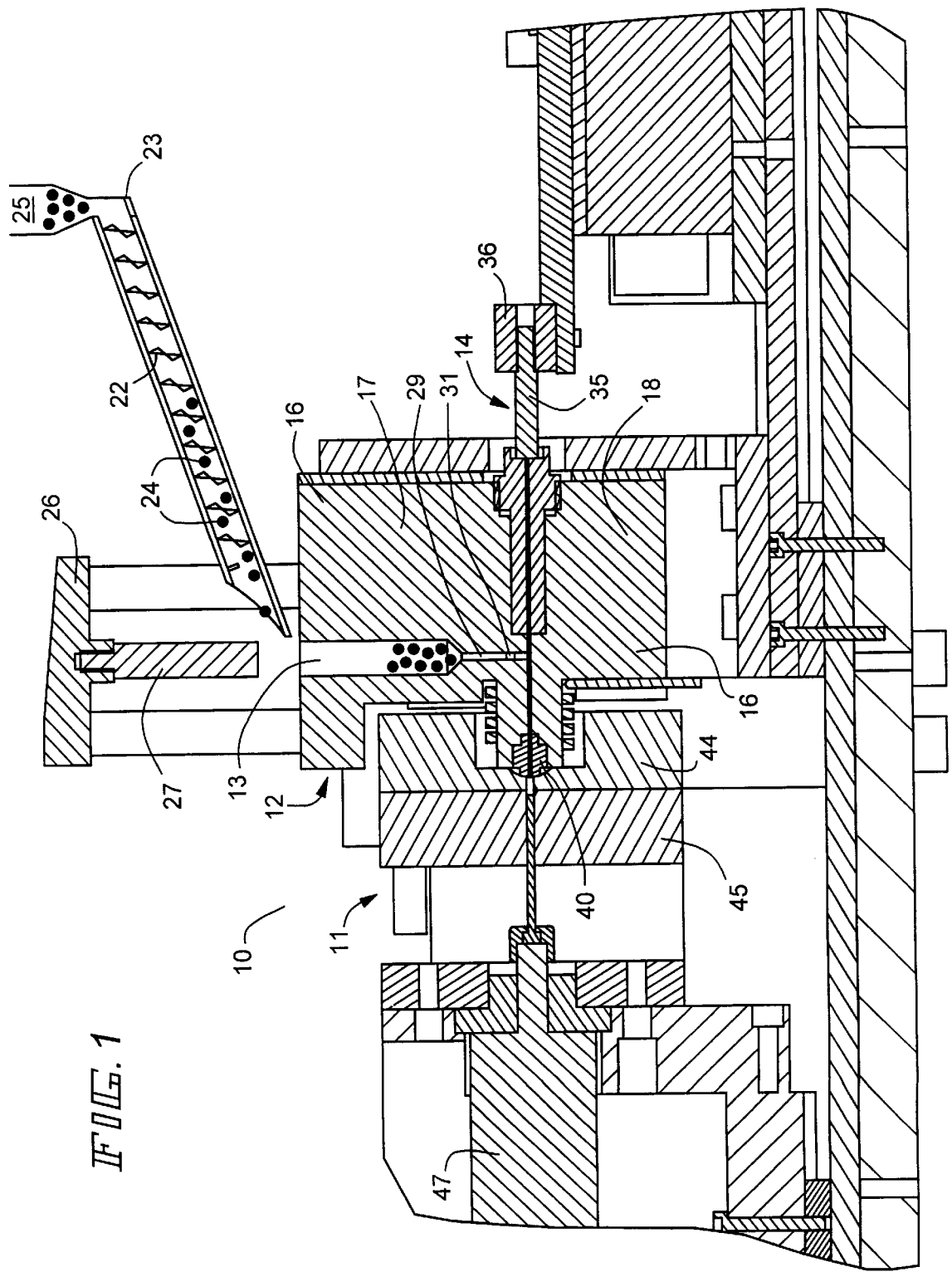
FIG. 1 is a cross-sectional view of the injection molding machine illustrating the loading of plastic or resin pellets into the plasticizing portion of the injection molding machine in accordance with the present invention.

Referring now to the drawings wherein like numerals have been used throughout the several views to designate the same or similar parts, the present invention is directed to an injection molding machine for molding microparts. The microparts generally possess wall thickness ranging between about 0.025 to 0.3 mm. As shown in FIGS. 1–4 of the drawings, the micro injection molding machine 10 is comprised of a plasticizing portion 12, an injection portion 14 and a mold portion 11. The plasticizing portion 12 is adapted to soften and control feed molten plastic or resin into the injection portion of the molding machine. The injection molding machine 10 includes a heated cylinder block 16 comprised of an upper portion 17 and a lower portion 18 which are integral to one another. The upper and lower portions of the cylinder block 16 preferably include heater holes 20 therein, best shown in FIGS. 5 and 6. The heating holes are positioned throughout the block 16 and are adapted to receive electrical cartridge heaters 21 therein to provide uniform heating of the cylindrical block.

Figure 2:
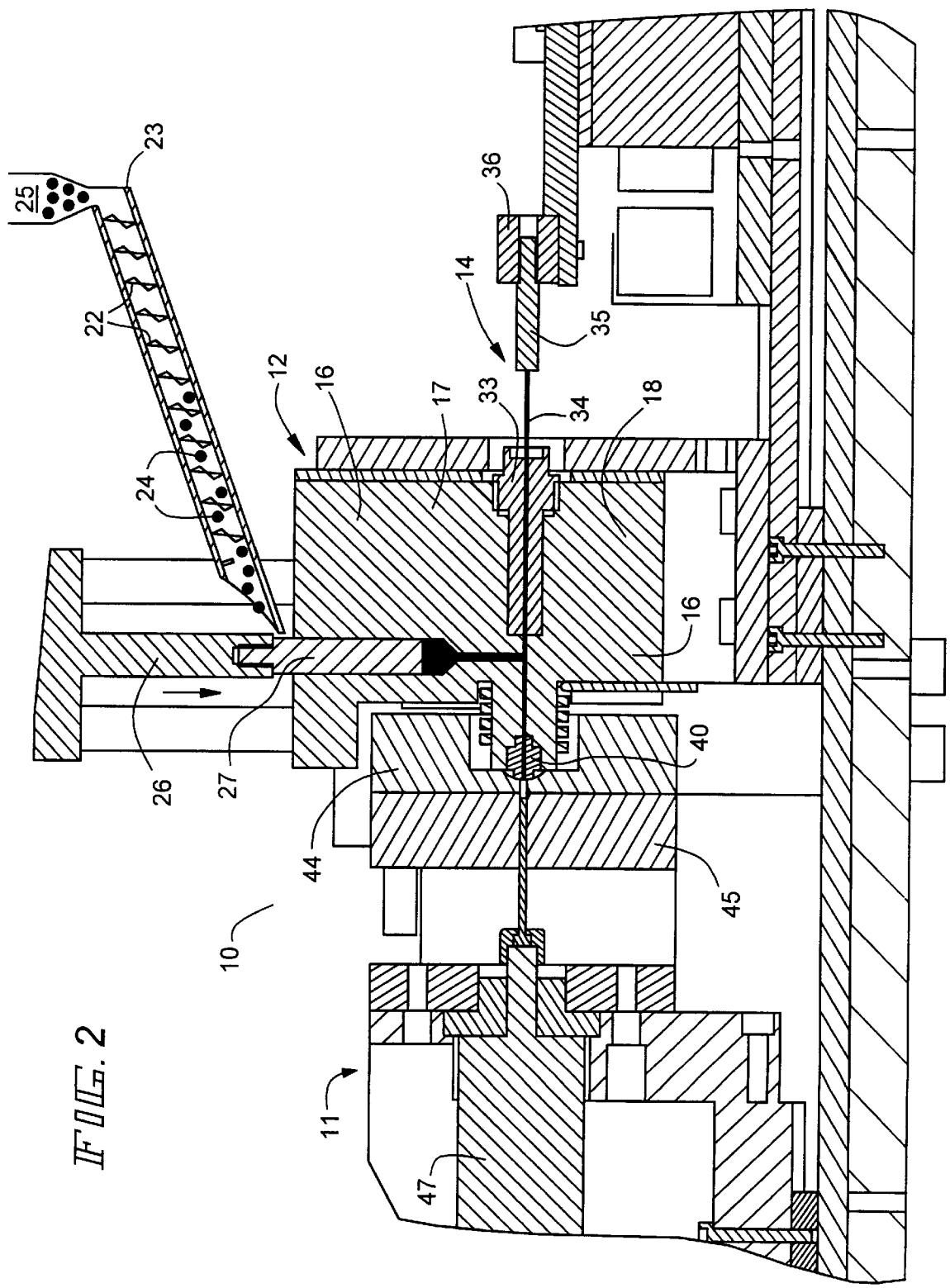
FIG. 2 is a cross-sectional view of the injection molding machine illustrating the melting of the plastic or resin pellets in the plasticizing portion and the filling of the injection portion with a predetermined shot volume of molten plastic in accordance with the present invention.
Figure 3:
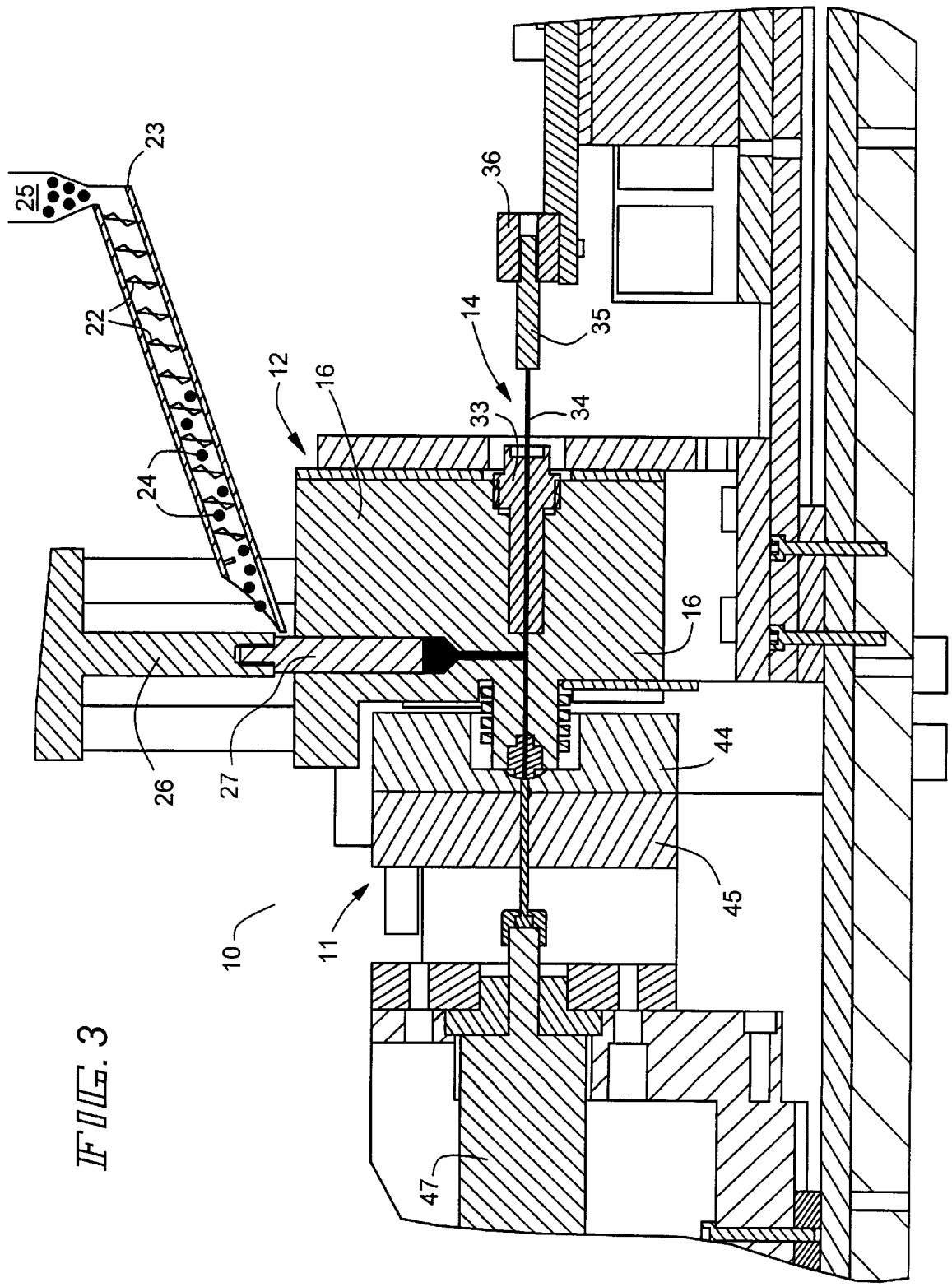
FIG. 3 is a cross-sectional view of the injection molding machine illustrating the injection of plastic or resin material through the resin flow channel and nozzle into the mold by movement of the linear electric motor in accordance with the present invention.

The plasticizing portion 12 includes a spiral screw or auger feeder member 22 which is driven for clockwise rotation by a stepper motor (not shown). The upper end 23 of the spiral screw member is adapted to receive the plastic or resin pellets 24 from a hopper 25 containing a supply of plastic pellets. The plasticizing portion 12 further includes a plasticizing air cylinder 26 which drives a plasticizing plunger 27 within the plasticizing chamber or bore 13, positioned within the heated cylinder block 16 and containing the heated plastic pellets. The bore 13 is adapted to receive the plastic or resin pellets 24 from the spiral screw member 22, the position as shown in FIG. 1. The plasticizing plunger 27 cooperates with the bore 13 in the heated cylinder block 16 to compress and heat the plastic or resin pellets to a liquid state, the position as shown in FIG. 2. The plasticizing plunger 27 is sized with respect to the bore 13 to permit trapped air to escape past the plunger and bore wall during the compression and heating of the plastic pellets.

Figure 5:
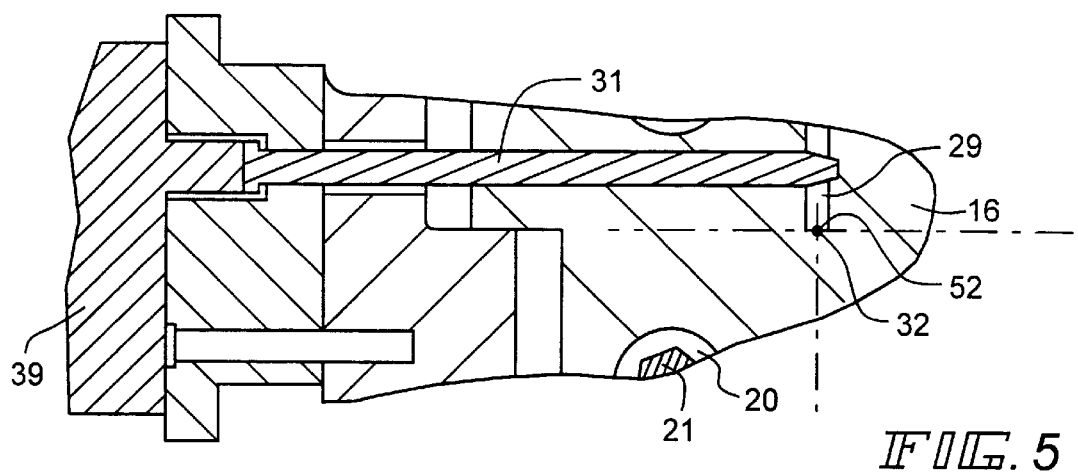
FIG. 5 is an enlarged fragmentary view illustrating the valve member closed between the plasticizing portion and the injection portion of the injection molding machine in accordance with the present invention.
Figure 6:
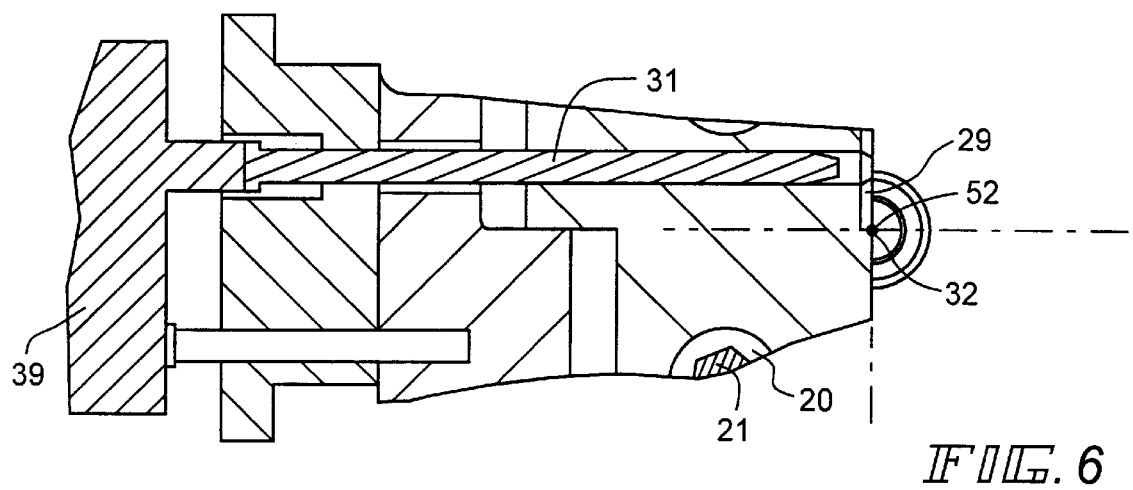
FIG. 6 is an enlarged fragmentary view illustrating the valve member opened between the plasticizing portion and the injection portion to permit the flow of a predetermined shot volume of melted plastic resin material into the injection portion in accordance with the present invention.
Figure 7:
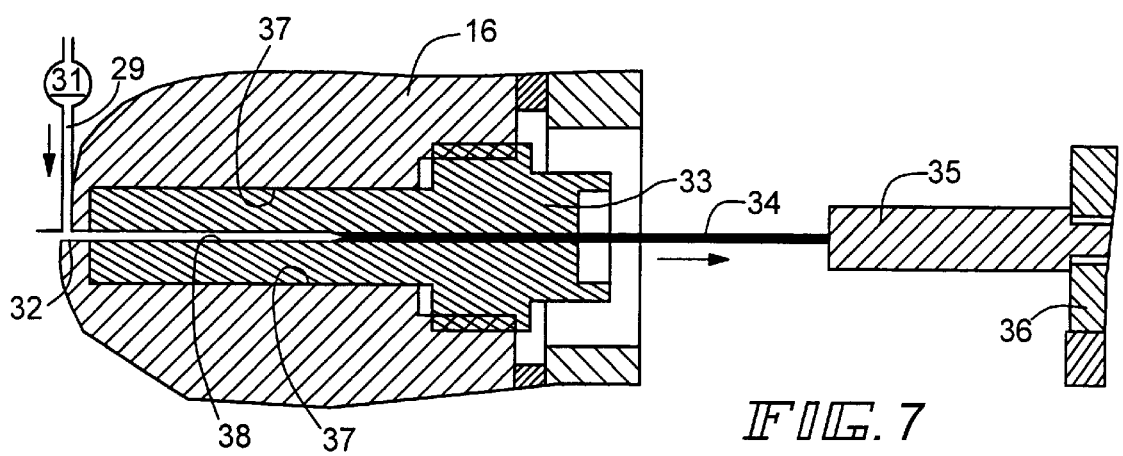
FIG. 7 is an enlarged fragmentary view illustrating the position of the injection pin during filling of the resin flow channel with molten plastic or resin material from the plasticizing portion in accordance with the present invention.

Also, as shown in FIGS. 1 and 7, a conduit 29 exits the bore 13 and communicates with the resin flow channel 32 of the injection portion 14 of the injection molding machine 10. Located within the conduit 29 is a high pressure valve member 31 which is operable between an open and closed position, as shown in FIGS. 5 and 6. The conduit 29 is adapted to intersect the resin flow channel 32 to deliver and fill the injection channel with melted plastic or resin material, as will hereinafter be described.

The injection portion 14 of the molding machine 10 is comprised of a resin flow channel 32, an injection cylinder 33 and an injection pin 34 which is engageable with a push pin 35 coupled to a linear drive means or motor means 36, best shown in FIGS. 1–4 and 7. The injection cylinder 33 is removably mounted to a bore 37 positioned between the upper portion 17 and lower portion 18 of the cylinder block 16. The injection cylinder 33 includes a bore 38 extending the length thereof (FIG. 7) which defines the resin flow channel 32 therein and which is adapted to receive injection pin 34 for back and forth movement therein. The resin flow channel 32 is axially aligned with a nozzle 40 which engages a sprue 41 in mold member 44 to permit injection of the molten plastic or resin material through the sprue into the mold defined by mold members 44 and 45, best shown in FIG. 4. If necessary, coil heaters 42 may be provided about the cylinder block where the resin flow channel engages the nozzle 40 to facilitate and maintain the plastic or resin material in a molten state. The coil heater is shown in FIGS. 1–4.

The injection pin member 34 is adapted to be received within the bore 38 of the injection cylinder 33 and to maintain a very close tolerance with respect to the bore within the range of about 0.012 mm or less. This precision fitting of the injection pin within the injection cylinder permits for the application of high pressures at very high speeds during the injection phase while preventing backflow of molten resin between the injection pin and the injection cylinder 33 during the injection operation. As shown in FIG. 5, the valve member 31, positioned in the conduit 29 of the plasticizing portion 12, is closed during the injection step (FIG. 3) to prevent backflow of the resin material into the lower pressure capacity plasticizing cylinder. As shown in FIGS. 5 and 6, the valve member 31 is a tapered valve which is powered by an air cylinder 39. The valve member 31 is positioned inside the heated cylinder block and is maintained at a proper uniform plastic melt temperature.

Figure 8:
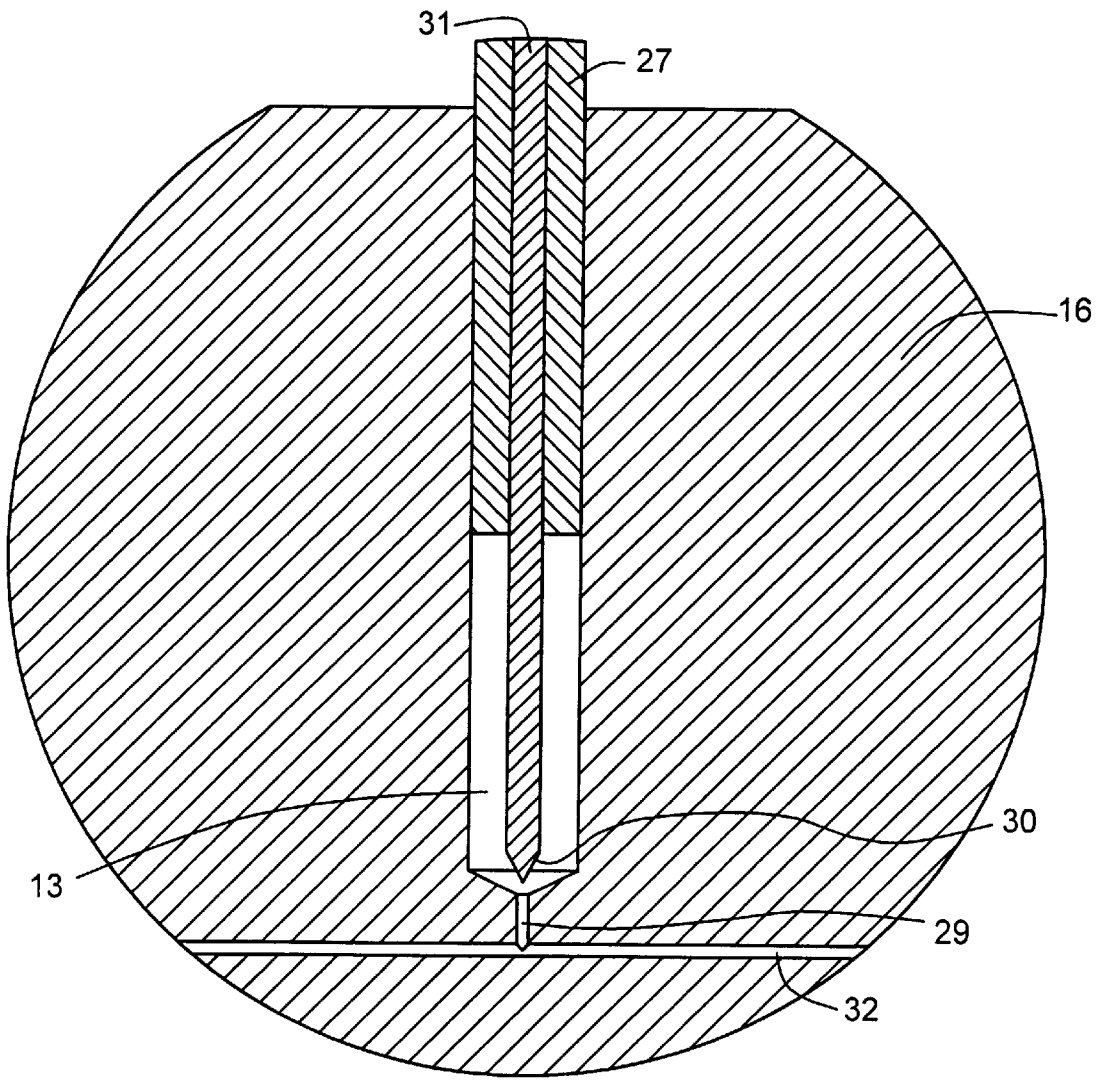
FIG. 8 is an enlarged fragmentary view illustrating the positioning of a valve member between the plasticizing portion and the injection portion in accordance with a further embodiment of the present invention.

In another embodiment of the present invention, the valve member 31 is positioned concentrically with the plasticizing cylinder 26 and plunger 27 to predeterminely control the flow of molten plastic through conduit 29 from the plasticizing portion to the injection portion. In FIG. 8, the tapered end 30 of the valve member 31 is structurally arranged to engage the entrance to conduit 29 to block the flow of molten plastic into the injection portion during the injection step (FIG. 3) and to prevent backflow of the resin material into the pressure capacity plasticizing cylinder.

The process of melting the plastic and filling the injection portion is shown in FIG. 2. The melted plastic resin pellets 13 are compressed by the plasticizing plunger 27 and valve member 31 is opened, as shown in FIGS. 6 and 8, the plasticizing plunger 27 forces the heated plastic or resin material to flow into the resin flow channel 32 and the injection cylinder 33 of the injection portion 14. This fills the resin flow channel, the position as shown in FIG. 2 and illustrated in FIG. 7.

The plasticizing plunger 27 is moved into the chamber or bore 13 in the upper portion 17 by an air cylinder 26. The cylinder block 16, surrounding the plasticizing plunger and chamber, is heated to the proper melting and injection processing temperature for the particular plastic or resin being molded. Generally, this temperature is between about 350° to 650° F. This heating is accomplished by the electrical cartridge heaters 21 which are inserted into the heating holes 20. The heaters are preferred to be positioned within the cylinder block at an orientation which is positioned axially with respect to the injection cylinder and resin flow channel. The force acting upon the plasticizing plunger 27 by the plasticizing air cylinder 26 and the heating resulting from the electrical cartridge heaters, facilitates melting of the plastic or resin pellets within the chamber or bore 13.

The valve member 31, positioned either in conduit 29 (FIGS. 1–6) or associated with conduit 29 (FIG. 8), and which is located between the resin flow channel and injection cylinder and the plasticizing chamber bore 13, is opened while the nozzle is maintained against the mold member 44 and sprue 41. The valve member 31 is moved between the open and closed position by air cylinder 39 or by a concentric mounted cylinder, not shown in FIG. 8. During the period of time valve member 31 is open, the injection portion is receiving and filled with melted plastic and the nozzle 44 is positioned against the mold while the plastic part previously molded is cooling. This prevents melted plastic from exiting the nozzle 40 into the mold during the filling step.

A linear motor 36 controls the motion of the injection pin 34. During filling of the injection portion with plastic, a small load or pressure against the injection pin is maintained by the linear motor 36. Because a greater pressure is applied to the melted plastic in the plasticizing chamber by the plasticizing plunger during filling, the molten plastic entering the injection portion 14 pushes back the injector pin 34 away from the nozzle 40, the position of the flow channel arrow in FIG. 7. This forcing of the injector pin and linear motor away from the nozzle aids in preventing voids from forming in the molten plastic contained in the plasticizing chamber or bore 13. Also, the engagement of the injection pin with the linear motor provides for the predetermined control of the required shot volume for the part to be molded. As the injection pin is forced axially rearwardly within the injection cylinder, a linear position encoder sensor feed back to the linear motor controller stops the injection pin at a predetermined location. Because the plastic is held under pressure as the injection pin moves axially rearwardly from the nozzle, the consistency of the plastic shot volume within the resin flow channel for subsequent molding of the next micropart is properly and predeterminely controlled. When the linear motor 36 reaches the proper position for the desired shot volume to be injected through the resin flow channel, nozzle and sprue into the mold, the linear motor is stopped and the load on the plasticizing cylinder is removed. Then, the valve member 31 is closed (FIG. 5) to remove the load on the plasticizing cylinder. Thereafter, the linear motor 36 moves axially rearwardly from the injection cylinder approximately 1 mm to relieve pressure on the melt in front of the injection pin.

Figure 4:
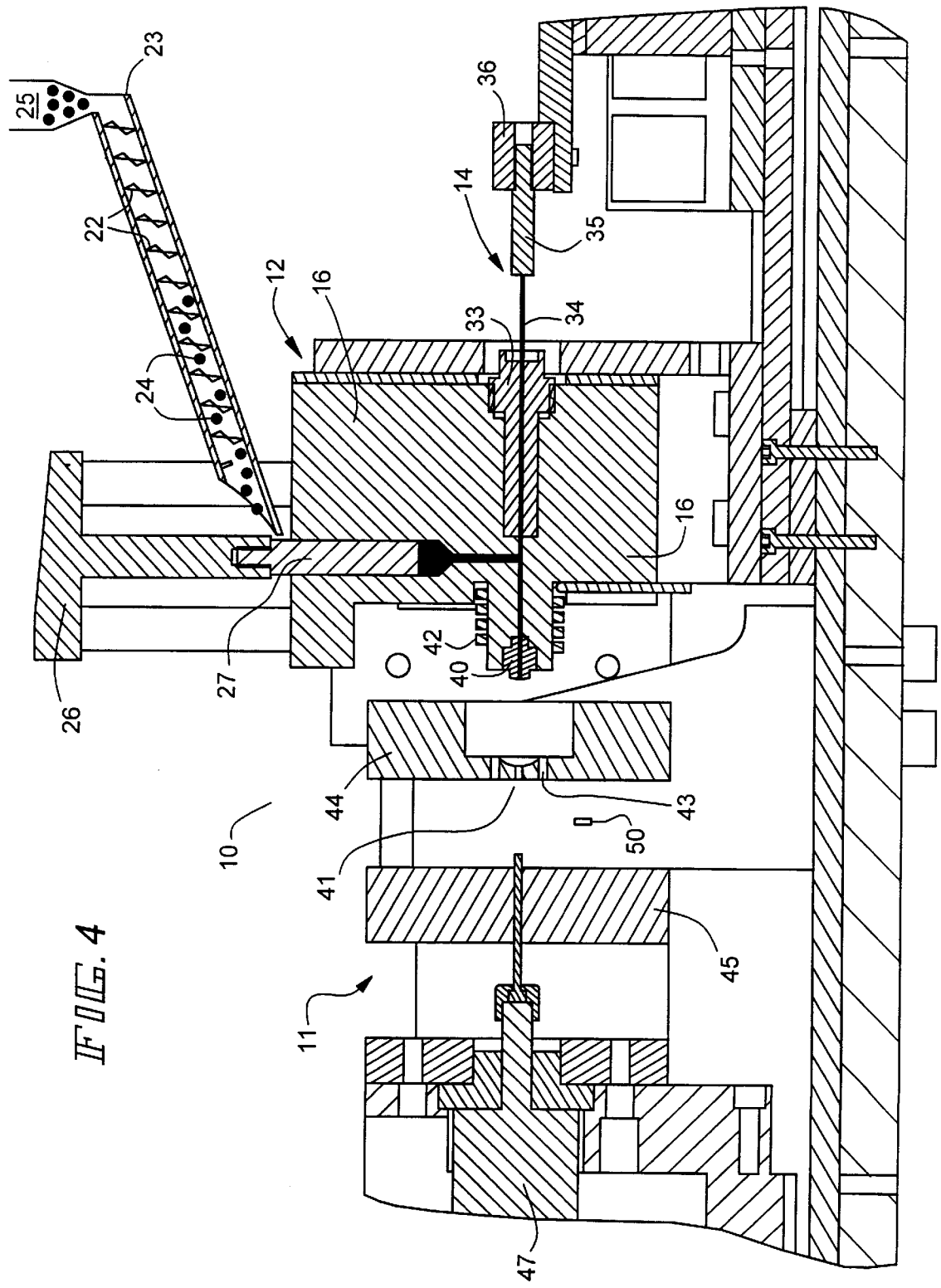
FIG. 4 is a cross-sectional view of the injection molding machine illustrating axial movement of the mold portion from the injection portion and the opening of the mold to eject the molded micropart in accordance with the present invention.

As shown in FIG. 4, after the filling of the shot volume into the injection portion and the completion of the injection of plastic into the mold (FIG. 3), the mold members 44 and 45 are moved axially from the nozzle 40 and opened with respect to one another. During opening of the mold cavity, an ejector or lifter pin 43 or a suction hose (not shown) is applied to remove the molded micropart 50 from the molded cavity. The nozzle 40 is maintained during this period of time a distance from the cold mold to prevent cooling of the nozzle and the subsequent hardening of the molten plastic or resin material contained in the nozzle. The mold members are coupled together in axially aligned relationship and are axially moved relative to the nozzle by mold air cylinder 47.

When the mold is closed and axially moved to engage the nozzle, the injection pin is in the rearward position. The engagement of the mold against the nozzle by air cylinder 47 prevents leakage of plastic between the nozzle 40 and sprue 41. Plastic is then injected into the cavity of the mold by actuating the electric motor means 30 to drive the ejector pin forward.

The term "electric motor means" may be used to describe a rotary motor coupled to a ball screw device which converts the rotary motion to a linear motion. However, it is a preferred embodiment of the present invention that the electric motor means is a linear motor 36 which directly provides linear motion to the injection pin 34. The term "linear motor" is used to describe a motor that is electrically driven in a linearly motion rather than in a rotary motion. One type of linear motor useful in the present invention is a linear servo or stepper motor manufactured and sold by Trilogy Linear Motor, Webster, Tex. The linear motor provides a linear motion which engages and controls the speed and pressure engaging the injection pin.

In order to achieve a high quality molded micropart, the control of the filling of the mold and the pressure maintained as the plastic freezes is very important. Typically, during the first portion of the filling the mold cavity with plastic, the linear motor 36 moves the piston forward at a preset speed independent of the pressure developed in the plastic. This needs to be at a very high speed (up to 125 cm/second velocity) for small, thin-walled microparts. At high injection speeds, the shear in the plastic material causes the viscosity of the plastic to decrease. This reduction in viscosity permits the machine to fill thin-wall thicknesses before the plastic freezes. Wall thickness between 0.025 and 0.30 mm is achieved in the molded micropart. The linear motor speed can be controlled with a servo drive to change the velocity of the motor at predetermined steps during the filling stage. This is required when complex geometry microparts are molded because it is desirable to have a constant flow front of plastic as the mold is filled.

When the mold cavity is nearly filled, on the order of 95 percent filled, the injection motion is switched from a velocity control to a load or plastic pressure control. This is accomplished by sensing the position of the injection pin 34 with a linear encoder and when the predetermined position where the mold cavity is nearly filled is reached, the control system switches to a pressure control. Then, the pressure applied to the injected plastic is controlled by time steps correlated to different values. Typically, initially a higher pressure and then a lower pressure is desired. This permits plastic from the injection cylinder to flow into the thin-walled micropart as it cools and shrinks.

The linear motor or rotary motor coupled to a ball screw device are ideally suited for molding microparts because of their control of velocity, position and load from a single servo controller. These types of motors are capable of applying upwards of 100,000 psi and achieving an injection time of 0.01 second when a molded micropart having a wall thickness of about 0.05 mm is desired. Also, these type of motors provide the ability to start and stop very quickly as required for the small shot size volume of plastic in accordance with the present invention. After the plastic is injected into the mold and the holding pressure time completed, the mold cools to freeze the molten plastic. While this cooling is being accomplished, the molding process repeats the step of filling the injection portion with molten plastic and ejecting the molded part, as previously described.

The present injection molding machine 10 utilizes air cylinders to drive the movement of the plasticizing plunger and to drive the axial movement of the mold portion with respect to the injection portion. The injection pin movement is accomplished utilizing a linear motor to provide high speed and high pressure during injection. Such use of air cylinders and electric motor means facilitates a clean room atmosphere to permit molding of all types of microparts, for medical and the electric motor means facilitates a clean room atmosphere to permit molding of all types of microparts, for medical and the electronic fields.

Additionally, the positioning of the injection cylinder, injection pin, resin flow channel, the nozzle and mold at the centerline 52 (FIGS. 5 and 6) of the heated cylinder block 16, prevents misalignment of the various parts as the temperature of the components change. This centerline positioning reduces the dimensional differences between the various parts to less than 0.1 mm. This enhanced position is facilitated by mounting the heated cylinder block 16, containing the injection cylinder, injection pin, resin flow channel and nozzle as one centerline position on the molding machine frame 52, (FIGS. 5–6) and ensuring the axial alignment and cooperation with the mold portion 11.

We claim:

1. An injection molding machine for molding microparts containing a plastic shot volume of between about 0.001 to 3.5 cubic centimeters, including in combination:

a mold portion axially moveable relative to the molding machine between an open and close position, said mold portion including a cavity plate member, a core plate member and ejector means to remove the molded micropart from said mold portion;

a plasticizing portion adapted to receive and inch the plastic material, said plasticizing portion including a heatable cylinder block having a chamber and a cooperating plunger operatively moveable into and out of said chamber;

an injection portion structurally arranged to receive a predetermined shot volume of the plastic material from said plasticizing portion, said injection portion including an axially aligned injection pin, a resin flow channel, a nozzle and an injection cylinder, with said injection pin being axially moveable within said injection cylinder between an at-rest position and an extended position wherein said predetermined shot volume of between about 0.001 to 3.5 cubic centimeters of plastic is injection within a pressure range of between about 5,000 to 100,000 psi through said resin flow channel, said nozzle and into the mold portion to mold the micropart;

a conduit positioned between said plasticizing portion and said injection portion to permit the flow of melted plastic material from said plasticizing portion to said injection portion;

valve means associated with said conduit and operable between an open position wherein a predetermined shot volume of melted plastic flows into said injection portion to position said injection pin at said at-rest position and a closed position wherein said melted plastic in said plasticizing portion is isolated from said injection portion during movement of said injection pin from said at-rest position to said extended position; and electric motor means engageable with said injection pin to axially move the same from said at-rest option to said extended position to inject the molten plastic into said mold portion.

2. The injection molding machine in accordance with claim 1, wherein said electric motor means is a linear motor which moves said injection pin at an injection speed of 500 cm/seconds or less.

3. The injection molding machine in accordance with claim 1, wherein said heatable cylinder block of said plasticizing portion is maintained at a temperature between about 350° to 650° F.

4. The injection molding machine in accordance with claim 1, wherein said valve means is a valve member structurally positioned perpendicularly with respect to said conduit and operable between said open position and said closed position.

5. The injection molding machine in accordance with claim 1, wherein said valve means is a valve member concentrically positioned with respect to said cooperating plunger.

6. The injection molding machine in accordance with claim 1, wherein said conduit means extends between said chamber in said plasticizing portion and said resin flow channel in said injection portion.

7. The injection molding machine in accordance with claim 1, wherein said axial centerline control of said mold portion with respect to said injection portion is about 0.1 mm or less to thereby reduce the dimensional differences between the molded microparts.

8. The injection molding machine in accordance with claim 1, wherein the predetermined shot volume received by said injection portion is between about 0.01 to 2.0 cubic centimeters.

9. The injection molding machine in accordance with claim 1, wherein said resin flow channel has a diameter of about 0.5 to 6.0 mm.

10. The injection molding machine in accordance with claim 1, wherein the wall thickness of the molded micropart is between about 0.025 to 0.3 mm and said injection time for the movement of the injection between said at-rest and said extended position is between about 0.01 to 0.5 seconds.

11. In an injection molding machine for molding microparts containing a plastic shot volume of between about 0.001 to 3.5 cubic centimeters, the injection molding machine including a mold portion and an injection portion adapted to receive a predetermined shot volume of plastic, with the injection portion including an axially aligned injection pin, a resin flow channel and a nozzle, with the injection pin being axially moveable within the resin flow channel between an at-rest position and an extended position wherein the predetermined shot volume of between about 0.001 to 3.5 cubic centimeters of plastic is injected through the resin flow channel, the nozzle and into the mold portion to mold the micropart, the injection molding machine comprising:

a linear motor means engageable with the injection pin within the resin flow channel of the injection portion to move the pin from the at-rest position to the extended position to thereby inject the molten plastic into the mold portion between a plastic pressure of about 5,000 to 100,000 psi.

* * * * *

UNITED STATES PATENT AND TRADEMARK OFFICE
CERTIFICATE OF CORRECTION

PATENT NO. : 6,267,580 B1
DATED : July 31, 2001
INVENTOR(S) : Phillip M. Leopold and Andrew R. Leopold It is certified that error appears in the above-identified patent and that said Letters Patent is hereby corrected as shown below:

Column 2,
Line 10, after the word "microparts" insert -- , --;
Line 18, delete the word "severally" and insert -- severely --;
Line 20, after the word "processes", delete -- , --;
Line 50, delete the word "utilize" and insert -- utilizes --.

Column 4,
Line 20, delete the word "an" and insert -- a --.

Column 7,
Line 66, delete the word "feed" and insert -- fed --.

Column 8,
Line 27, after the word "in", insert -- an --;
Line 28, after the word "by", insert -- the --.

Column 9,
Line 21, after the word "time", insert -- is --.
Line 54, delete the word "close" and insert -- closed --;
Line 58, delete the word "inch" and insert -- melt --.

Column 10,
Line 10, delete the word "injection" and insert -- injected --;
Line 27, delete the word "option" and insert -- portion --.

Signed and Sealed this

Fifteenth Day of January, 2002

Attest:

JAMES E. ROGAN
*Attesting Officer*        *Director of the United States Patent and Trademark Office*